US006780664B1

(12) United States Patent
Goruganthu et al.

(10) Patent No.: US 6,780,664 B1
(45) Date of Patent: Aug. 24, 2004

(54) NANOTUBE TIP FOR ATOMIC FORCE MICROSCOPE

(75) Inventors: Rama R. Goruganthu, Austin, TX (US); Michael R. Bruce, Austin, TX (US); Thomas Chu, Austin, TX (US); Miguel Santana, Jr., Buda, TX (US); Robert Powell, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 10/324,327

(22) Filed: Dec. 20, 2002

(51) Int. Cl.$^7$ .............................................. H01L 21/00
(52) U.S. Cl. .............................. 438/52; 438/50; 438/99; 438/903
(58) Field of Search ............................. 438/50, 52, 99, 438/800, 903

(56) References Cited

U.S. PATENT DOCUMENTS

| | | | |
|---|---|---|---|
| 6,159,742 A | 12/2000 | Lieber et al. ............... | 436/164 |
| 6,189,374 B1 | 2/2001 | Adderton et al. ............ | 73/105 |
| 6,346,189 B1 | 2/2002 | Dai et al. .................... | 205/766 |
| 6,401,526 B1 | 6/2002 | Dai et al. ..................... | 73/105 |
| 6,457,350 B1 | 10/2002 | Mitchell ...................... | 73/105 |
| 6,597,090 B1 * | 7/2003 | Mancevski .................. | 313/309 |
| 6,630,772 B1 * | 10/2003 | Bower et al. ............... | 313/311 |
| 2003/0143327 A1 * | 7/2003 | Schlaf et al. ............ | 427/249.1 |

OTHER PUBLICATIONS

Miyashita et al., "Selective Growth of Carbon Nanotubes for Nano Electro Mechanical Device", The 14$^{th}$ IEEE International Conference on Micro Electro Mechanical Systems, Jan. 21–25 2001, pp. 301–304.*

Ural et al., "Electric–field–aligned growth of single–walled carbon nanotubes on surfaces", App. Phys. Letts., vol. 81, No. 18, Oc 28, 2002, pp. 2464–2466.*

Stephen C. Minne et al.; *Bringing Scanning Probe Microscopy Up to Speed*; Feb. 1999; pp. 141–157.

Quate Group, Stanford University; *Piezoresistive Introduction*; http://www.stanford.edu/group/quate_group/Home/HomePages/Presentations/Basic.PDF; Nov. 17, 1998; pp. all.

H. T. Soh; *Integrated Synthesis of Carbon Nanotubes*; http://www.stanford.edu/group/quate_group/Home/HomePages/Presentations/nanotube.PDF; Quate Group, Stanford University; Nov. 23, 1998; pp. all.

Dai Group, Stanford University; *Nanotubes as AFM tips*; http://www.stanford.edu/group/quate_group/Home/HomePages/Presentations/NanotubeLitho.PDF; Nov. 23, 1998; pp. all.

H. T. Soh; *Electrical Contacts to Carbon Nanotubes*; http://www.stanford.edu/group/quate_group/Home/HomePages/Presentations/nanotube_local.PDF; Nov. 23, 1998; pp. all.

NanoDevices, Inc.; *Active Probe*; http://www.nanodevices.com/active_probe.html; Nov. 18, 2002; pp. all.

* cited by examiner

Primary Examiner—Amir Zarabian
Assistant Examiner—Christy Novacek
(74) Attorney, Agent, or Firm—Timothy M. Honeycutt

(57) ABSTRACT

Various microscopy probes and methods of fabricating the same are provided. In one aspect, a method of fabricating a microscopy probe is provided that includes providing a member and forming a first film on the member. The first film fosters growth of carbon nanotubes when exposed to a carbon-containing compound. A second film is formed on the first film. The second film has an opening therein that exposes a portion of the first film. A carbon nanotube is formed on the exposed portion of the first film.

28 Claims, 6 Drawing Sheets

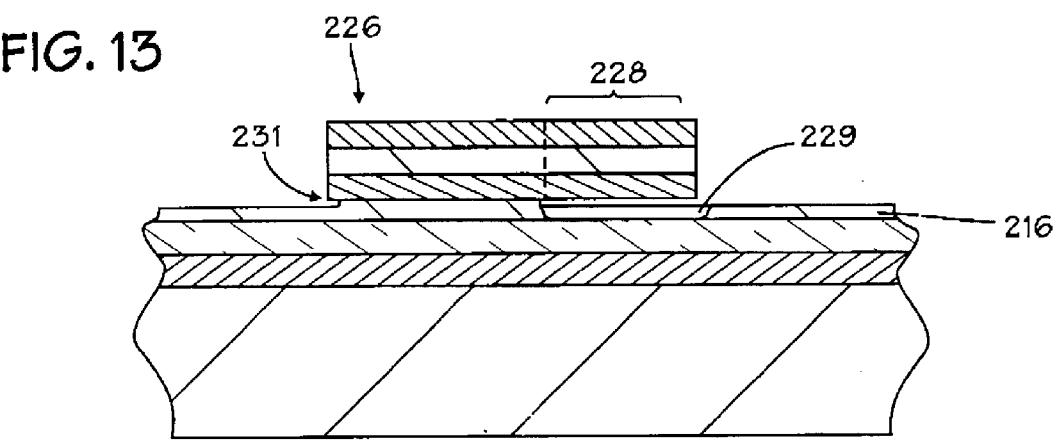
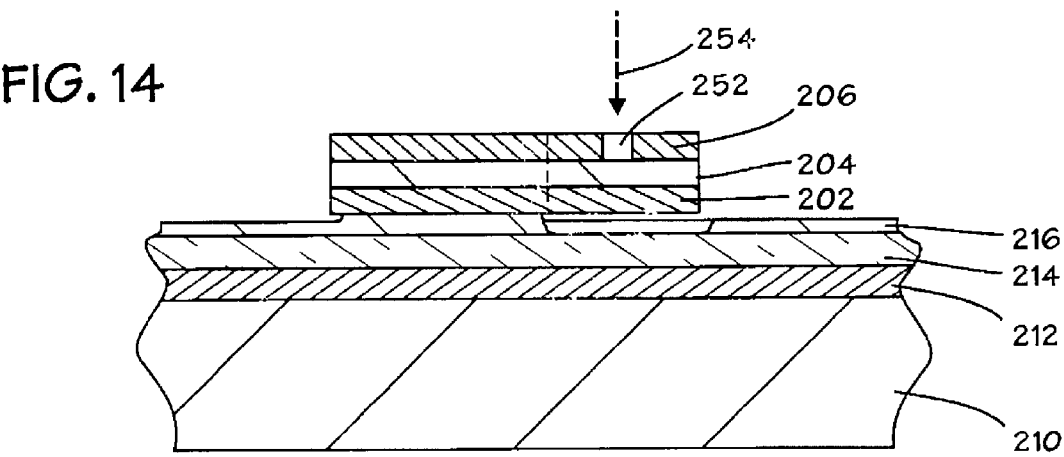
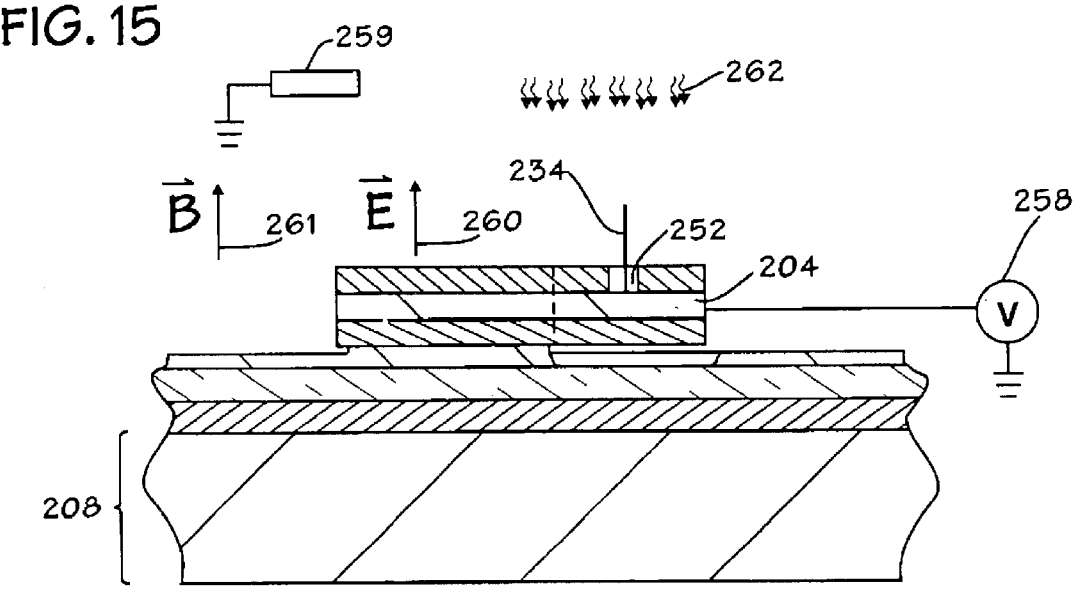

NANOTUBE TIP FOR ATOMIC FORCE MICROSCOPE

BACKGROUND OF THE INVENTION

1. Field of the Invention

This invention relates generally to semiconductor processing, and more particularly to scanning probe tips and methods of making the same.

2. Description of the Related Art

Atomic force microscopy generally involves scanning a stylus or probe across a microscopic topography, such as an integrated circuit structure, and sensing the forces exerted on the stylus. The stylus is provided with a small geometry tip that physically contacts the surface topography. The technique has been widely used in metrology of structures in photoresist, interlevel dielectric layers, sidewall angles, trench depths and surface morphology. The scanning resolution of the probe is dependent on the radius of curvature of the probe tip that contacts a given topographical feature.

Early conventionally fabricated probe tips were composed of sharpened silicon. Even after multiple oxidation and etching sharpening steps, such conventional tips had a tip radius of curvature of over 10.0 nm. Tips of such size work well in scanning features of greater than 10.0 nm in lateral dimension. However, the trend in micro machining and integrated circuit fabrication is toward further miniaturization.

Carbon nanotubes have been proposed as an alternative to conventionally fabricated probe tips. Single-walled carbon nanotubes have diameters on the order of 1.0 nm and may be formed with aspect ratios as high as 1000:1. There is thus the potential for better resolution. Carbon nanotubes have a high bulk modulus such that mechanical strength is not necessarily sacrificed even at such small geometries.

Despite these advantages, accurate growth of carbon nanotubes has proved to be a technical challenge. In a conventional process, chemical vapor deposition is used in conjunction with a catalyst that serves as a seed site for tube formation. However, the growth kinetics are not well understood. As a result, conventionally fabricated carbon nanotubes frequently form with irregular shapes and in seemingly random directions. The final tube structures often resemble the antlers of a deer.

The present invention is directed to overcoming or reducing the effects of one or more of the foregoing disadvantages.

SUMMARY OF THE INVENTION

In accordance with one aspect of the present invention, a method of fabricating a microscopy probe is provided that includes providing a member and forming a film on the member. The film fosters growth of carbon nanotubes when exposed to a carbon-containing compound. The member is exposed to an electric field. A carbon nanotube is formed on the film. The electric field causes the carbon nanotube to form in a preselected direction.

In accordance with another aspect of the present invention, a method of fabricating a microscopy probe is provided that includes providing a member and forming a first film on the member. The first film fosters growth of carbon nanotubes when exposed to a carbon-containing compound. A second film is formed on the first film. The second film has an opening therein that exposes a portion of the first film. A carbon nanotube is formed on the exposed portion of the first film.

In accordance with another aspect of the present invention, a method of fabricating a microscopy probe is provided that includes forming a member on a substrate and forming a first film on the member. The first film fosters growth of carbon nanotubes when exposed to a carbon-containing compound. A second film is formed on the first film. The second film has an opening therein that exposes a portion of the first film. A carbon nanotube is formed on the exposed portion of the first film. The member is separated from the substrate.

In accordance with another aspect of the present invention, a microscopy probe is provided that includes a member and a first film on the member. The first film fosters growth of carbon nanotubes when exposed to a carbon-containing compound. A second film is positioned on the first film. The second film has an opening therein that extends to a portion of the first film. A carbon nanotube is provided that has a first portion positioned in the opening and coupled to the exposed portion of the first film.

BRIEF DESCRIPTION OF THE DRAWINGS

The foregoing and other advantages of the invention will become apparent upon reading the following detailed description and upon reference to the drawings in which.

FIG. 13 is a cross-sectional view like FIG. 12 depicting etching of portions of a film underlying the probe tip in accordance with the present invention;

FIG. 14 is a cross-sectional view like FIG. 13 depicting formation of an opening in an upper most film of the probe in accordance with the present invention;

FIG. 15 is a cross-sectional view like FIG. 14 depicting fabrication of one or more carbon nano tubes in the opening in accordance with the present invention.

DETAILED DESCRIPTION OF SPECIFIC EMBODIMENTS

Figure 1:
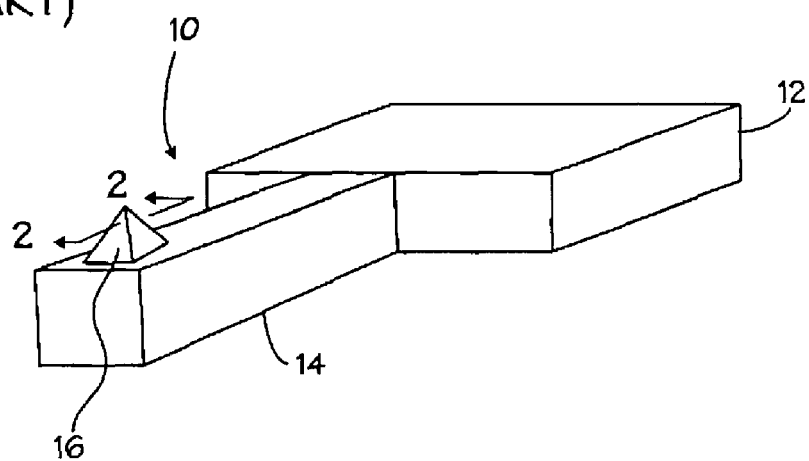
FIG. 1 is a pictorial view of a conventional atomic force microscopy ("AFFM") probe.

In the drawings described below, reference numerals are generally repeated where identical elements appear in more than one figure, Turning now to the drawings, and in particular to FIG. 1, therein is shown a pictorial view of a conventional atomic force microscopy ("AFM") probe 10. The probe 10 includes a base 12, a cantilever 14 and a tip 16. The cantilever 14 is frequently fabricated from silicon nitride and the base 12 is similarly fabricated from silicon nitride or another type of dielectric material. The tip 16 is commonly fabricated from silicon that has been sharpened through one or more oxidation and etching steps.

Figure 2:
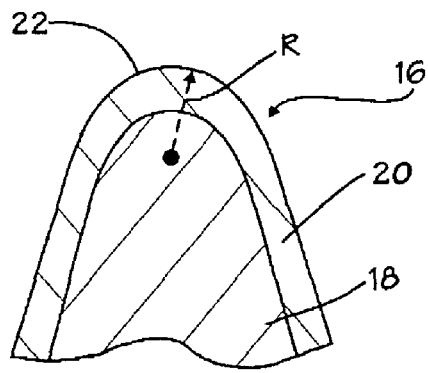
FIG. 2 is a cross-sectional view of a portion of the tip of FIG. 1 taken at section 2—2.

The minimum resolution provided by the tip 16 is a function of its radius of curvature. This is better seen in FIG. 2, which is a cross-sectional view of a portion of the tip 16 taken at section 2—2. The tip 16 consists of an underlying silicon structure 18 that is coated with a thin film 20 of native oxide. The minimum lateral resolution of the tip 16 is determined by the radius of curvature R at the contact surface 22 of the tip 16. In conventional AFM tip fabrication, the radius of curvature R is typically on the order of 8.0 nm or larger. Thus, micro structures that are less than 8.0 nm in lateral dimension may not be accurately resolved by the conventional tip 16.

Figure 3:
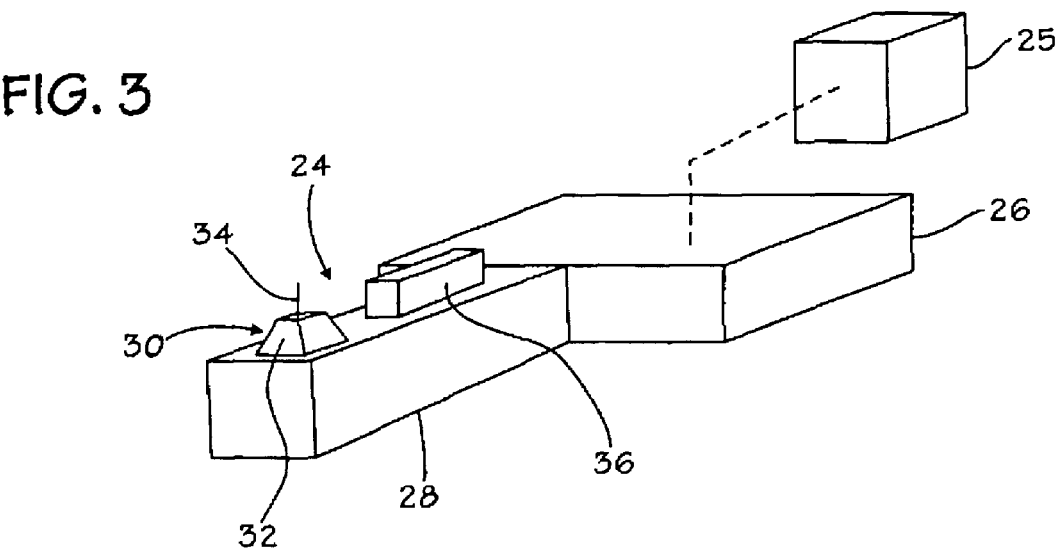
FIG. 3 is a pictorial view of an exemplary embodiment of a scanning probe in accordance with the present invention.

An exemplary embodiment of a scanning probe 24 in accordance with the present invention may be understood by referring now to FIG. 3, which is a pictorial view. The probe 24 may be coupled to an atomic force microscope instrument 25 and used for scanning. For simplicity of illustration, the probe 24 is shown separated from and magnified relative to the instrument 25. In an exemplary embodiment, the probe 24 includes a base structure or handle 26 and a member or cantilever 28 that may be coupled thereto or fabricated integrally therewith. The cantilever 28 is provided with a projection or tip 30 that consists of a base portion 32 and a carbon nanotube 34 projecting upwardly therefrom. There may be more than one carbon nanotube 34, but only one is shown for simplicity of illustration. The probe 24 may be operated in a variety of modes, such as, for example, piezo resistive, inter-digital detection, or other AFM techniques. To this end, the probe 24 may be provided with detector/actuator structures, represented schematically by the structure 36. The structure 36 may be, for example, a piezo electric actuator and piezoresistive deflection sensor, an interdigital detection structural array or other device.

The cantilever 28 and the base portion 32 may be fabricated from a variety of materials suitable for AFM probes, such as, for example, silicon, silicon nitride, silicon oxynitride, laminates of these or the like. The base portion 32 will advantageously include one or more films to be described in more detail below that enhance the fabrication of the carbon nanotube 34. The carbon nanotube 34 itself is advantageously a single walled nanotube, although multi-walled tubes are optional. The length of the carbon nanotube 34 is largely a matter of design discretion. Lengths from less than one to up to several microns in length are envisioned.

Figure 4:
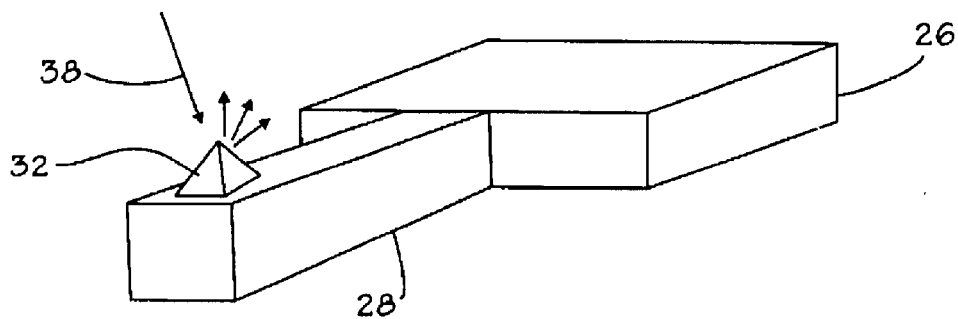
FIG. 4 is a pictorial view of the probe undergoing focused ion beam milling of the probe tip thereof in accordance with the present invention.
Figure 5:
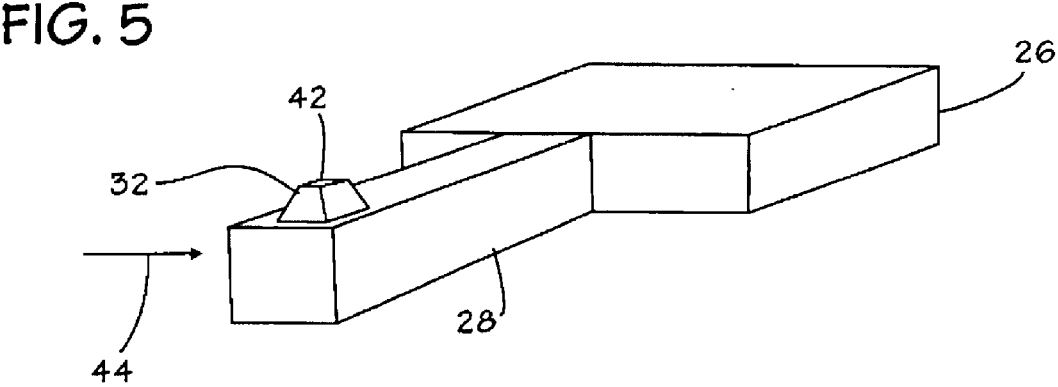
FIG. 5 is a pictorial view like FIG. 4 depicting the base portion of the probe tip following milling in accordance with the present invention.

An exemplary process flow for fabricating the probe 24 may be understood by referring now to FIGS. 4, 5, 6, 7 and 8 and initially to FIG. 4. The handle 26, the cantilever 28 and the base portion 32 may be fabricated using well-known techniques for fabricating AFM tips. The base portion 32 will have a generally pyramidal shape with an initially sharp peak as shown in FIG. 4. The base portion 32 is subjected to a focused ion beam ("FIB") 38 in order to mill away the top 40 of the base structure 32 and yield a flat upper surface 42 as shown in FIG. 5. The flat surface 42 will facilitate vertical growth of the carbon nanotube 34 during a subsequent processing step. The lateral dimension of the upper surface 42 is advantageously about 30.0 to 60.0 nm.

Figure 6:
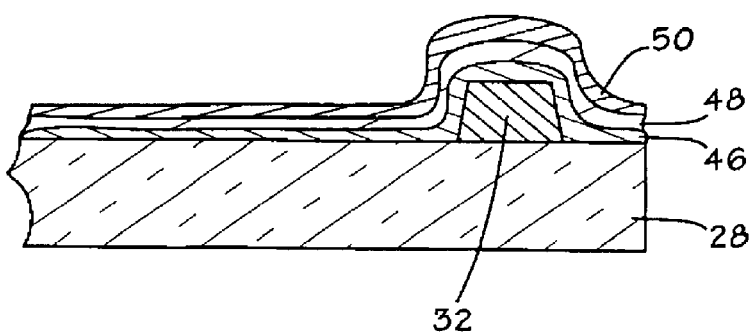
FIG. 6 is a side view of a portion of the cantilever of the probe following deposition of a stack of films as a precursor to fabrication of a carbon nano tube tip in accordance with the present invention.
Figure 7:
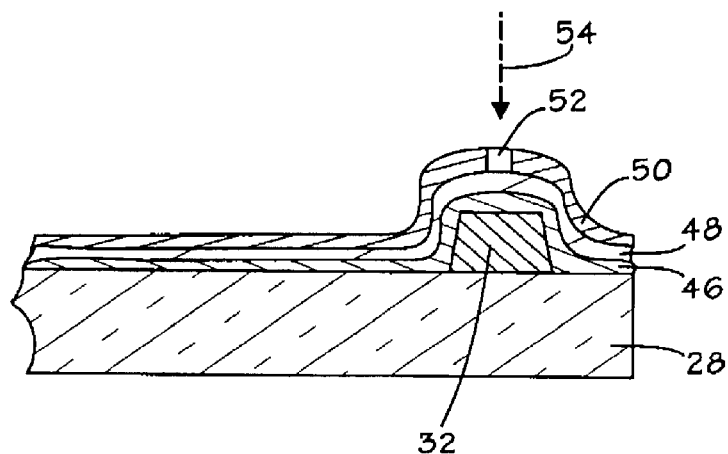
FIG. 7 is a cross-sectional view like FIG. 6 depicting formation of an opening in the top film of the stack in accordance with the present invention.
Figure 8:
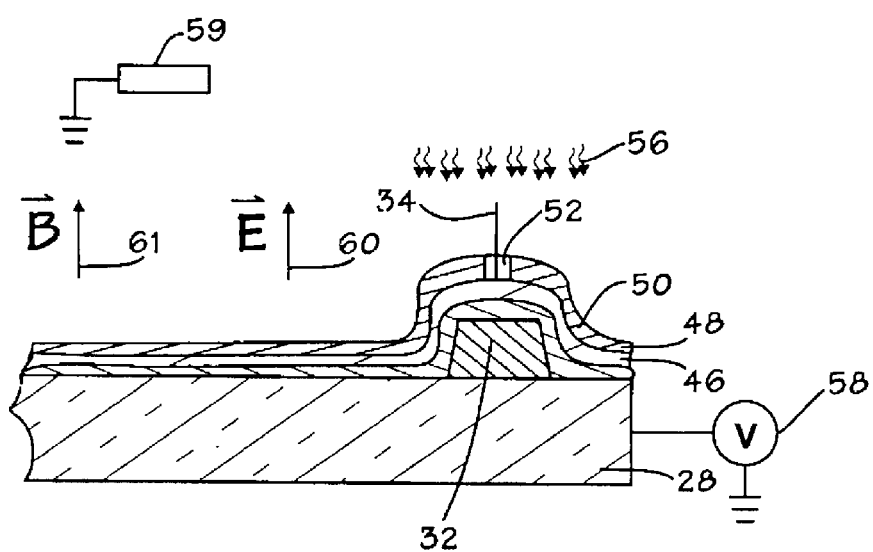
FIG. 8 is a cross-sectional view like FIG. 7 depicting formation of one or more carbon nano tubes in the opening in accordance with the present invention.

The remaining views, namely FIGS. 6, 7 and 8, are cross-sectional views of the cantilever 28 viewed from the perspective of the arrow 44 in FIG. 5. Referring now to FIG. 6, various films are formed on the cantilever 28 and in particular over the base portion 32. Initially, a film 46 is formed to function as an adhesion layer. This may be advantageous where, for example, the next-formed catalytic film 48 will have less than desirable adhesion characteristics with the underlying base portion 32 and the cantilever 28. A variety of materials may be used, for example, tungsten, titanium nitride, titanium tungsten, or the like. In an exemplary embodiment, the adhesion film 46 may have a thickness of about 200 to 500 and be deposited by chemical vapor deposition ("CVD") or physical vapor deposition ("PVD") or evaporation techniques. The adhesion layer 46 is optional where the catalytic film exhibits acceptable adhesion to the cantilever 28.

Next, a catalytic film 48 is applied over the adhesion film 46. The purpose of the catalytic film 48 is to foster growth of the carbon nanotube 34 when exposed to a carbon-containing compound. The film 48 provides seed sites for carbon nanotube growth during a later-performed carbon nanotube deposition step. A variety of well-known materials may be used for the catalytic film 48 that facilitate the growth of carbon nanotubes, such as, for example, iron, cobalt, nickel, oxides or mixtures of these or the like. In an exemplary embodiment, the film 48 may have a thickness of about 800 to 1,000 and be deposited by CVD or PVD or evaporation techniques.

Following the formation of the catalytic film 48, a sacrificial film 50 is formed thereon. The film 50 is sacrificial in that a portion of it will be removed in a later process to establish an opening extending down to the catalytic film 48. The sacrificial film 50 is advantageously composed of a material that is relatively chemically inert and which exhibits good adhesion to the underlying catalytic layer 48. Exemplary materials include tungsten, gold, platinum or the like. In an exemplary embodiment, the sacrificial layer 50 may have a thickness of about 800 to 1,200 and be deposited by CVD or PVD or evaporation techniques.

Referring now to FIG. 7, an opening 52 is formed in the sacrificial film 50 that extends to the catalytic film 48. The opening 52 is advantageously formed using a FIB 54, although conventional lithography may be used as well. The opening 52 may have a diameter that is somewhat smaller than the lateral dimension of the flat 42 of the base 32. For example, the opening may have a diameter of about 3.0 to 15.0 nm. Currently available FIB devices can produce a focused ion beam 54 with about a 5.0 mn focus. The opening 52 is designed to expose a limited area of the catalytic film 48 so that carbon nanotube growth is limited to a relatively small area. Indoing so, the potential for growing laterally multiple carbon nanotubes is reduced.

The fabrication of the carbon nanotube 34 will now be described in conjunction with FIG. 8. The cantilever 28 is subjected to a CVD process using a hydrocarbon gas 56 or other source of carbon. Exemplary carbon sources include, for example, methane, acetylene, ethylene or the like. Hydrogen may also be added to the source gas. An inert carrier gas, such as helium, argon, nitrogen or the like may be used as well. It is desirable for the carbon nanotube 34 to grow as vertically as possible. To this end, a bias from a voltage source 58 is applied to the cantilever 28 with respect to a grounded electrode 59 to establish an electric field 60. The electric field 60 causes the carbon nanotube to form preferentially along a path aligned with the electric field 60, in case along a path substantially normal to the cantilever 28. As noted above, the opening 52 restricts carbon nanotube growth to a limited area of the catalytic film 38 and discourages lateral growth.

Optionally, a magnetic field 61 may be used to provide directional growth of the carbon nanotube 34. In this case, the cantilever 28 need not be biased. However the cantilever 28 should be oriented spatially relative to the magnetic field 61 so that the desired direction of carbon nanotube growth is aligned with the flux lines of the magnetic field 61.

The length of the CVD process will depend on the anticipated growth rate of the carbon nanotube 34. If the grown tube 34 exceeds a desired length, then well-known cutting techniques may be used to provide a shorter length as desired.

The carbon nanotube 34 will exhibit relatively high electrical conductivity. However, if a more insulating tube is desired, a dopant, such as fluorine, may be added to the tube 34 to provide a more dielectric character. The dopant may be added after the growth of the tube 34 if the dopant is deemed to be too reactive with the carbon source gas. Depending on the level of the dopant, the tube 34 might be formed with semiconducting properties.

Figure 9:
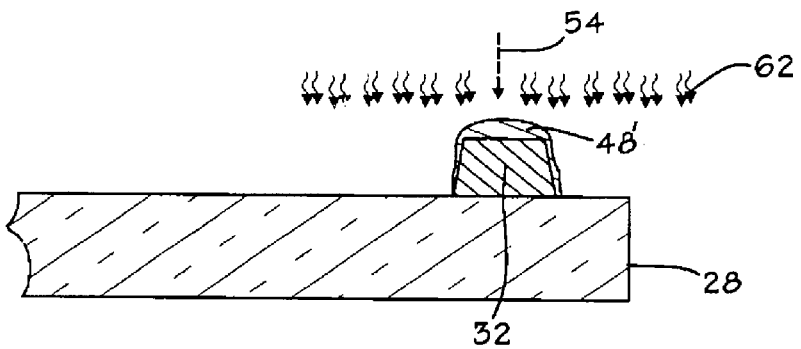
FIG. 9 is a cross-sectional view like FIG. 8, but depicting an alternate exemplary embodiment involving application of a catalytic film on a base portion of a probe tip using focused ion beam deposition in accordance with the present invention.
Figure 10:
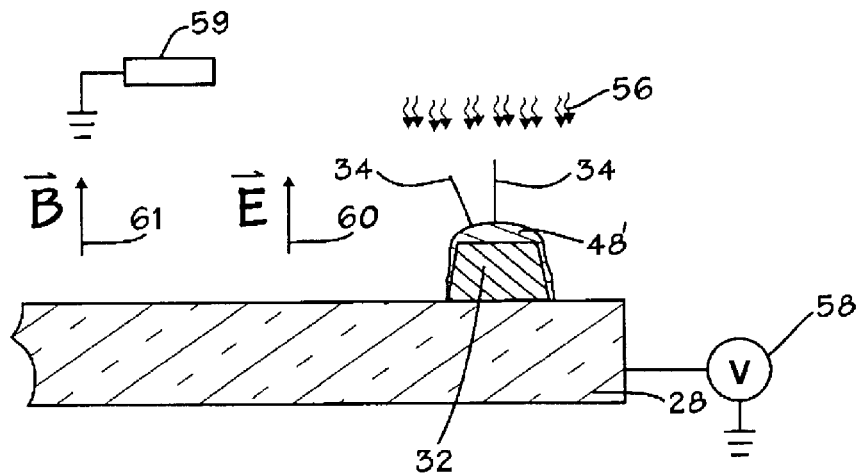
FIG. 10 is a cross-sectional view like FIG. 9 depicting formation of one or more carbon nanotubes on the catalytic film in accordance with the present invention.

An alternate exemplary process flow in accordance with the present invention may be understood by referring now to FIGS. 9 and 10. FIG. 9 is a side view from a perspective similar to that of FIG. 6. In this illustrative embodiment, the cantilever 28 is provided with a base structure 32 as generally described elsewhere herein. A catalytic film 48' is formed on the base structure 32 by using a focused ion beam 54 in the presence of a vapor 62. The vapor 62 is advantageously composed of a metallic precursor compound, containing a catalytic material suitable for CVD generation of carbon nanotubes. Compounds of iron, cobalt, or nickel or the like may be used. One example is iron pentacarbonyl. The narrowly focused FIB 54 provides for the decomposition of the precursor vapor 162 in a highly localized area confined primarily to the base structure 32. There may be some slight overlap on the sidewalls of the base 132 as shown in FIG. 9.

Following the formation of the catalytic layer 48', one or more carbon nanotubes 34 are grown thereon as shown in FIG. 10 by CVD using a hydrocarbon or other vapor 56, and application of a bias with respect to a grounded electrode 59 to the cantilever 28 from the voltage source 58 that establishes the electric field 60 as shown. As with the foregoing illustrative embodiment, the electric field 60 establishes a preferential direction for the growth of the carbon nanotubes 34. Optionally, a magnetic field 61 may be used as described elsewhere herein.

Figure 11:
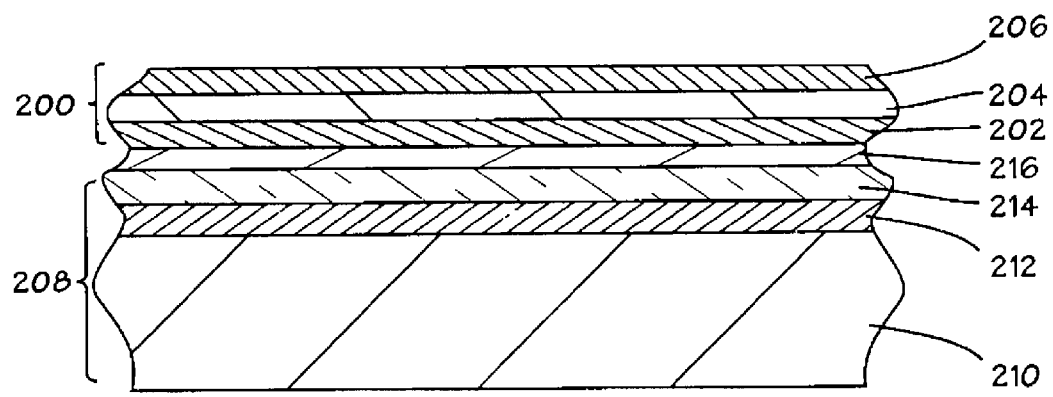
FIG. 11 is a cross-sectional view of a semiconductor-on-insulator substrate and a stack of films formed thereon as a precursor to fabrication of a probe in accordance with the present invention.

An alternate exemplary process flow for fabricating an AFM probe in accordance with the present invention may be understood by referring now to FIGS. 11, 12, 13, 14, 15 and 16 and initially to FIG. 11. A stack 200 of films 202, 204 and 206 is fabricated on a substrate 208 consisting of a semiconductor layer 210, an insulating layer 212, and another semiconductor layer 214. Another insulating film 216 may be interposed between the stack 200 and the substrate 208 to serve as an etch stop as desired. The substrate 208 may be a conventional silicon-on-insulator or other semiconductor-on-insulator substrate. If silicon-on-insulator, the layers 210 and 214 may be silicon, and the insulator layer 212 may be oxide.

The film 202 will ultimately serve as a structural member or base for a subsequently formed cantilever. It is desirable for the film 202 to be composed of a material that may be etched selectively to the underlying etch stop layer 216. Exemplary materials include for example, silicon nitride, silicon oxynitride, tungsten or the like. The film 216 is accordingly composed of a material that will function as an etch stop during the patterning of the overlying stack 200. For example, the film 216 may be composed of oxide, either thermally grown or deposited by CVD. The film 204 is advantageously composed of a catalyst material of the type described elsewhere herein. The film 206 advantageously serves as a sacrificial layer of the type described elsewhere herein and may be composed of the same materials, e.g., tungsten, gold, etc.

Figure 12:
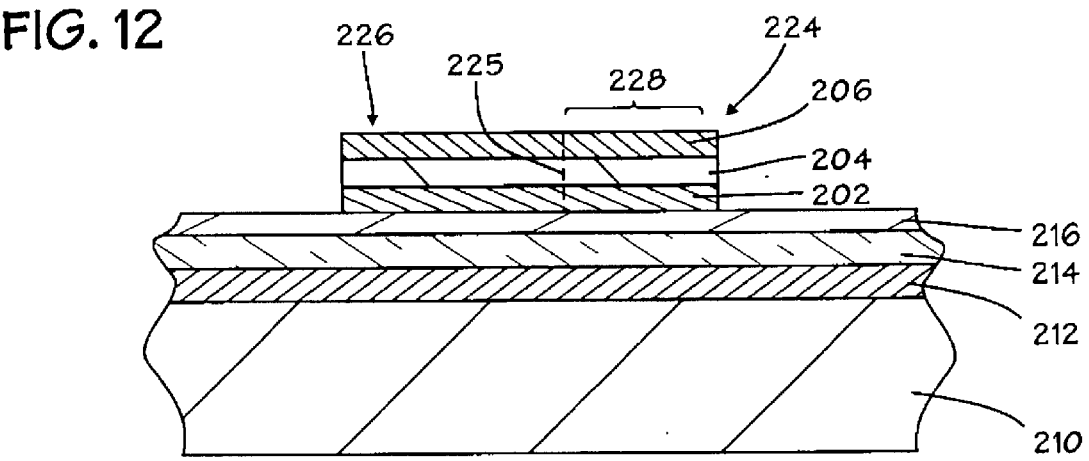
FIG. 12 is a cross-sectional view like FIG. 11 depicting lithographic patterning of the stack of films in order to define a probe in accordance with the present invention.

As shown in FIG. 12, the stack 200 is appropriately masked and etched to define a probe structure 224. The probe will have the same general footprint as the probe 24 depicted in FIG. 3. Since the probe structure 224 is depicted in section in FIG. 12, the dashed line 225 is included to indicate that the cantilever portion 228 is narrower in dimension in a plane perpendicular to the plane of the page than the base structure 226. The etching of the layers 206, 204 and 202 may be isotropic or directional as desired. Directional etching may be by reactive ion etching, chemical plasma etching or other directional etching techniques. Chemistries suitable to etch the layers 206, 204 and 202 may be used, such as, for example, $CF_4$, $SF_6$ or the like. Optionally, a wet etch may be used with suitable chemistries, such as phosphoric acid. If gold is used as a film material, an etch recipe that attacks gold, such as potassium iodide and iodine may be used an etchant. As noted above, the film 216 serves as an etch stop layer during the etch definition of the probe 224. The various portions 210, 212 and 214 are relatively unaffected by the etch definition of the probe tip 224.

As shown in FIG. 13, an isotropic etch of the film 216 is performed to produce a void 229 under and thereby free the cantilever 228 from the film 216. There will also be some undercut 231 of the handle structure 226. The cantilever 228 is freed from the underlying film 216 at this stage by etching in order to avoid that need for sawing or other mechanical cutting in a later stage that might fracture the relatively delicate cantilever 228. Well-known isotropic etch chemistries may be used to establish the void 229, such as, for example, a buffered HF dip, a buffered oxide etch of ammonium fluoride and HF, isotropic plasma etching or the like.

Refer now to FIG. 14, an opening 252 is formed in the sacrificial film 206 that extends to the catalytic film 204. The opening 252 is advantageously formed by an FIB ion beam 254, although conventional lithography may be used as well. The FIB formation of the opening 252 has little physical effect on the films 204, 202, 216, 214, 212 and 210.

With the opening 252 formed, a CVD process may be performed as shown in FIG. 15 to form one or more carbon nanotubes 234, again by application of a bias from a voltage source 258 with respect to a grounded electrode 259. Exposure of the catalytic layer 204 to the hydrocarbon vapor 262 in the presence of the electric field 260 results in a growth of the carbon nano-tube 234 along a preferential path, namely vertical in this case. Optionally, a magnetic field 261 may be applied.

Figure 16:
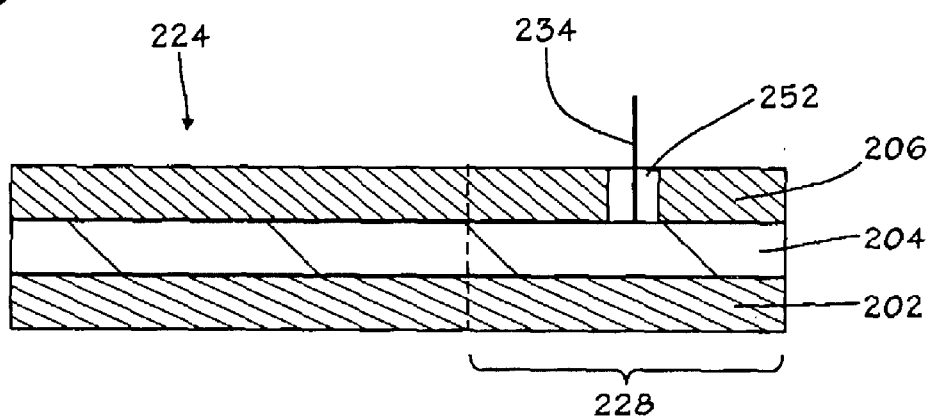
FIG. 16 is a cross-sectional view of the probe separated from the substrate in accordance with the present invention.

Referring now also to FIG. 16, following the fabrication of the carbon nanotube 234, the probe tip 224 may be separated from the substrate 208 using well-known cutting techniques to yield the probe tip 224 as shown. The probe tip 224 as fabricated, will include the laminate structure consisting of the film 202, 204 and 206. Accordingly, the bending properties of the cantilever portion 228 will have to be calibrated to take into account the effects of the strengths and interfaces of the various films 202,204 and 206 on the bending properties of the cantilever portion 228. Optionally, the cleaving of the substrate 208 shown in FIG. 15 may be performed to leave portions of the substrate 208 attached to the probe tip 224.

While the invention may be susceptible to various modifications and alternative forms, specific embodiments have been shown by way of example in the drawings and have been described in detail herein. However, it should be understood that the invention is not intended to be limited to the particular forms disclosed Rather, the invention is to cover all modifications, equivalents and alternatives falling within the spirit and scope of the invention as defined by the following appended claims.

What is claimed is:

1. A method of fabricating a microscopy probe, comprising:
    providing a member;
    forming a first film on the member, the first film fostering growth of carbon-nanotubes when exposed to a carbon-containing compound;
    forming a second film on the first film, the second mm having an opening therein exposing a portion of the first film; and
    forming a third film beneath the first film in order to facilitate adhesion of the first film to the member; and
    forming a carbon nanotube on the exposed portion of the first film.

2. The method of claim 1, comprising exposing the member to a magnetic field while forming the carbon nanotube, the magnetic field causing the carbon nanotube to form in a preselected direction.

3. The method of claim 1, wherein the member comprises a cantilever.

4. The method of claim 1, wherein the opening is formed by focused ion beam milling.

5. The method of claim 1, wherein the first film comprises iron, nickel or cobalt.

6. The method of claim of claim 1, wherein the member comprises a projection, the carbon nanotube being formed on the projection.

7. The method of claim 1, wherein the carbon nanotube comprises a single-walled carbon nanotube.

8. The method of claim 1, wherein the second film comprises tungsten.

9. The method of claim 1, comprising exposing the member to an electric field while forming the carbon nanotube, the electric field causing the carbon nanotube to form in a preselected direction.

10. The method of claim 9, wherein the preselected direction comprises a direction substantially normal to the member.

11. The method of claim 9, wherein the exposing the member to an electric field comprises applying an electrical bias to the member.

12. A method of fabricating a microscopy probe, comprising:
    forming a member on a substrate;
    forming a first film on the member, the first film fostering growth of carbon nanotubes when exposed to a carbon-containing compound;
    forming a second film on the first film, the second film having an opening therein exposing a portion of the first film;
    forming a third film beneath the first film in order to facilitate adhesion of the first film to the member;
    forming a carbon nanotube on the exposed portion of the first film; and
    separating the member from the substrate.

13. The method of claim 12, comprising exposing the member to a magnetic field while forming the carbon nanotube, the magnetic field causing the carbon nanotube to form in a preselected direction.

14. The method of claim 12, wherein the member comprises a cantilever.

15. The method of claim 12, wherein the opening is formed by focused ion beam milling.

16. The method of claim 12, wherein the first film comprises iron, nickel or cobalt.

17. The method of claim 12, wherein the exposing the member to an electric field comprises applying an electrical bias to the member.

18. The method of claim 12, wherein the member comprises a projection, the carbon nanotube being formed on the projection.

19. The method of claim 12, wherein the carbon nanotube comprises a single-walled carbon nanotube.

20. The method of claim 12, wherein the second film comprises tungsten.

21. The method of claim 12, comprising exposing the member to an electric field while forming the carbon nanotube, the electric field causing the carbon nanotube to form in a preselected direction.

22. The method of claim 21, wherein the preselected direction comprises a direction substantially nominal to the member.

23. A microscopy probe, comprising:
    a member;
    a first film on the member, the first film fostering growth of carbon nanotubes when exposed to a carbon-containing compound;
    a second film on the first film, the second film having an opening therein extending to a portion of the first film;
    a third film positioned between the first film and the member, the third film facilitating adhesion of the first film to the member; and
    a carbon nanotube having a first portion positioned in the opening and coupled to the exposed portion of the first film.

24. The microscopy probe of claim 23, comprising a projection coupled to the member, the carbon n nanotube being positioned on the projection.

25. The microscopy probe of claim 23, wherein the member comprises a cantilever.

26. The microscopy probe of claim 23, wherein the first film comprises iron, nickel or cobalt.

27. The microscopy probe of claim 23, wherein the carbon nanotube is positioned substantially normal to the member.

28. The microscopy probe of claim 23, comprising an atomic force microscopy instrument coupled thereto.

* * * * *

UNITED STATES PATENT AND TRADEMARK OFFICE
CERTIFICATE OF CORRECTION

PATENT NO. : 6,780,664 B1
DATED : August 24, 2004
INVENTOR(S) : Rama R. Goruganthu et al.

It is certified that error appears in the above-identified patent and that said Letters Patent is hereby corrected as shown below:

Column 4,
Lines 25, 40 and 51, insert -- angstroms -- after "500";

Column 7,
Line 34, delete "mm" and substitute -- film -- therefor;
Line 36, delete "and"; and Column 8,
Line 24, delete "12" and substitute -- 21 -- therefor.

Signed and Sealed this

Seventh Day of December, 2004

JON W. DUDAS
*Director of the United States Patent and Trademark Office*